United States Patent
Budde et al.

(10) Patent No.: US 10,230,263 B2
(45) Date of Patent: Mar. 12, 2019

(54) ADAPTIVE POWER AVAILABILITY CONTROLLER

(71) Applicant: SCHNEIDER ELECTRIC IT CORPORATION, West Kingston, RI (US)

(72) Inventors: Kristian Budde, Kolding (DK); Kim Ulletved Povlsen, Odense C (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 591 days.

(21) Appl. No.: 14/655,477

(22) PCT Filed: Dec. 26, 2012

(86) PCT No.: PCT/US2012/071639
§ 371 (c)(1),
(2) Date: Jun. 25, 2015

(87) PCT Pub. No.: WO2014/105008
PCT Pub. Date: Jul. 3, 2014

(65) Prior Publication Data
US 2015/0349585 A1    Dec. 3, 2015

(51) Int. Cl.
*H02J 7/00*   (2006.01)
*H02J 9/00*   (2006.01)
*H02J 9/06*   (2006.01)

(52) U.S. Cl.
CPC ............ *H02J 9/062* (2013.01); *H02J 7/0068* (2013.01); *H02J 7/0077* (2013.01); *Y10T 307/625* (2015.04)

(58) Field of Classification Search
CPC .. H02J 9/06; H02J 9/062; H02J 7/0068; H02J 7/0077; Y10T 307/625
(Continued)

(56) References Cited

U.S. PATENT DOCUMENTS 5,982,652 A    11/1999 Simonelli et al.
7,446,433 B2   11/2008 Masciarelli et al.
(Continued)

FOREIGN PATENT DOCUMENTS

EP    2071699 A2    6/2009
JP    H05336683 A   12/1993

OTHER PUBLICATIONS

Extended European Search Report from corresponding European Application No. 12890808.4 dated May 3, 2016.
(Continued)

*Primary Examiner* — Richard Tan
(74) *Attorney, Agent, or Firm* — Lando & Anastasi, LLP

(57) ABSTRACT

Systems and methods for controlling a UPS system to adapt to power availability requirements and to increase the efficiency of the UPS system are disclosed. The UPS system may include a modular UPS system or a parallel UPS system having a plurality of units. One method of controlling the UPS system includes obtaining actual power consumption by a load coupled to the UPS system, determining a log based power schedule in response to obtaining the actual power consumption and determining power availability for the UPS system in response to determining the log based power schedule. The method may further include adjusting a power capacity of the UPS system based on the power availability, by hibernating or activating at least one unit of the plurality of units of the UPS system.

19 Claims, 14 Drawing Sheets

(58) Field of Classification Search
USPC .................................. 307/43, 65, 66, 85, 86
See application file for complete search history.

(56) References Cited

U.S. PATENT DOCUMENTS

| | | |
|---|---|---|
| 2004/0160214 A1 | 8/2004 | Blair et al. |
| 2007/0050647 A1 | 3/2007 | Conroy et al. |
| 2007/0216229 A1 | 9/2007 | Johnson et al. |
| 2008/0028246 A1 | 1/2008 | Witham |
| 2011/0187197 A1 | 8/2011 | Moth |

OTHER PUBLICATIONS

Notification of Transmittal of the International Search Report and the Written Opinion of the International Searching Authority from corresponding PCT/US2012/071639 dated Mar. 19, 2013.

ADAPTIVE POWER AVAILABILITY CONTROLLER

This application is a U.S. National Stage Application under 35 U.S.C. § 371 from International Application No. PCT/US2012/071639, filed Dec. 26, 2012, which is hereby incorporated by reference in its entirety for all purposes.

BACKGROUND

1. Field of the Disclosure

Embodiments of the present disclosure relate generally to systems and methods for providing uninterruptible power. More specifically, embodiments relate to adaptive controllers for uninterruptible power supplies (UPS).

2. Description of Background

The use of uninterruptible power supplies having back-up systems to provide regulated, uninterrupted power for sensitive and/or critical loads, such as computer systems and other data processing systems, is known. FIG. 1 shows a typical, single phase, on-line UPS 10 used to provide regulated, uninterrupted power. The UPS 10 includes an input circuit breaker/filter 12, a rectifier 14, a control switch 15, a controller 16, a battery 18, an inverter 20 and an isolation transformer 22. The UPS also includes an input 24 for coupling to an AC power source, and an outlet 26 for coupling to a load.

The UPS 10 operates as follows. The circuit breaker/filter 12 receives input AC power from the AC power source through the input, filters the input AC power and provides filtered AC power to the rectifier 14. The rectifier rectifies the input voltage. The control switch 15 receives the rectified power and also receives DC power from the battery 18. The controller 16 determines whether the power available from the rectifier is within predetermined tolerances, and if so, controls the control switch to provide the power from the rectifier to the inverter 20. If the power from the rectifier is not within the predetermined tolerances, which may occur because of "brown out" or "black out" conditions, or due to power surges, then the controller controls the control switch to provide the DC power from the battery to the inverter 20.

The inverter 20 of the UPS 10 receives DC power and converts the DC power to AC power and regulates the AC power to predetermined specifications. The inverter 20 provides the regulated AC power to the isolation transformer 22. The isolation transformer is used to increase or decrease the voltage of the AC power from the inverter and to provide isolation between a load and the UPS. The isolation transformer is typically an optional device, the use of which is typically dependent on UPS output power specifications. Depending on the capacity of the battery and the power requirements of the load, the UPS 10 can provide power to the load during brief power source dropouts or for extended power outages.

UPS systems may be configured to provide greater capacity and/or reliability. For example, to provide enhanced scalability and/or redundancy, two or more UPS's may be electrically connected to form a single parallel UPS system with one output. In such a system, the combination of UPS's may provide increased power capacity to a load attached to the parallel UPS system. Also, if a first one of the UPS's coupled in parallel fails, the second one of the UPS's coupled in parallel may backup for the failed UPS.

Modular UPS systems having redundant control features are also known, and one such system is described in U.S. Pat. No. 5,982,652, the contents of which are incorporated herein by reference. In typical modular UPS systems, additional power modules and battery modules can be added to a UPS system to provide increased output power and longer runtime while on battery. Further, it is often desirable to leave a UPS in a powered down state, and restart the UPS when no AC power is available. Modular systems having this capability are known and include the Symmetra® UPS System available from American Power Conversion Corporation, West Kingston, R.I.

SUMMARY

UPS systems, such as those described above, may often operate inefficiently, for example due to being loaded at 60% or less of their full power rating. This may leave large parts or units of a UPS system not supporting any load and therefore running only to be ready to support a future increased load. According to aspects of the present disclosure, it is appreciated that there is a need to decrease energy consumption of a UPS system without decreasing power reliability.

At least some aspects and embodiments are directed to increasing the efficiency of a UPS system. This may be achieved by hibernating or turning off parts or units of the UPS system, thereby reducing energy waste by centralizing the load to only needed units. Aspects may be directed to controlling UPS systems having a plurality of units, such as a modular UPS system or a parallel UPS system. In one example, a unit may include a power module of a modular UPS system. In another example, a unit may include a UPS of a parallel UPS system. Aspects and embodiments may provide methods and apparatuses for estimating the needed power that must be available at a given time, for example based on logging actual power consumption and load changes, thus enabling adaptive control and shutdown of unneeded units of a UPS system based on the estimated power availability schedule.

According to one aspect, there is provided a method of controlling a UPS system having a plurality of units using a controller. The method comprises obtaining an actual power consumption by a load coupled to the UPS system, determining a log based power schedule in response to accessing the actual power consumption, determining a power availability for the UPS system in response to determining the log based power schedule, and adjusting a power capacity of the UPS system based on the power availability.

In some embodiments, the method may further comprise obtaining a user defined power schedule for the UPS system and determining the power availability for the UPS system may be based on the user defined power schedule and the log based power schedule. In some embodiments, the method may further comprise obtaining a user defined power overhead for the UPS system and determining the power availability for the UPS system may further be based on the user defined power overhead. Determining the power availability for the UPS system may include comparing the log based power schedule with the user defined power schedule. Determining the power availability may further include setting the power availability based on the user defined power overhead and one of the log based power schedule and the user defined power schedule in response to the comparing.

In some embodiments, adjusting the power capacity may include one of hibernating and activating at least one unit of the plurality of units of the UPS system. In one embodiment, the UPS system may include a modular UPS system and the at least one unit may include a power module of the modular UPS system. In another embodiment, the UPS system may include a parallel UPS system and the at least one unit may include a UPS of the parallel UPS system.

In various embodiments, determining the log based power schedule may include comparing the actual power consumption with a previous log based power schedule and determining the log based power schedule based on a result of the comparing. Determining the log based power schedule may further include setting the log based power schedule to the actual power consumption in response to determining that the actual power consumption is greater than or equal to the previous log based power schedule. Determining the log based power schedule may further include setting the log based power schedule to be less than the previous log based power schedule in response to determining that the actual power consumption is less than the previous log based power schedule.

According to another aspect, a UPS system comprises an input configured to receive input power from an input power source, an output configured to provide output power to a load, a plurality of units coupled to the input and the output and a controller coupled to the plurality of units. The controller is configured to obtain an actual power consumption by the load, determine a log based power schedule based on the actual power consumption, determine a power availability for the UPS system based on the log based power schedule, and adjust a power capacity of the UPS system based on the power availability.

Each unit of the plurality of units of the UPS system may be independently controllable by the controller. The controller may further be configured to adjust the power capacity based on one of hibernating and activating at least one unit of the plurality of units. In some embodiments, the plurality of units may include at least one of a power module and a UPS.

In various embodiments, the controller may be further configured to compare the actual power consumption with a previous log based power schedule and determine the log based power schedule based on a result of comparing the actual power consumption with the previous log based power schedule. The controller may be further configured to set the log based power schedule to the actual power consumption in response to a determination that the actual power consumption is greater than or equal to the previous log based power schedule. The controller may be further configured to set the log based power schedule to be less than the previous log based power schedule in response to a determination that the actual power consumption is less than the previous log based power schedule.

The controller may be further configured to obtain a user defined power schedule for the UPS system, and determine the power availability for the UPS system based on the user defined power schedule and the log based power schedule. The controller may further be configured to compare the log based power schedule with the user defined power schedule, and set the power availability based on one of the log based power schedule and the user defined power schedule in response to comparing the log based power schedule with the user defined power schedule.

According to another aspect, there is provided a UPS system comprising an input configured to receive input power from an input power source, an output configured to provide output power to a load, a plurality of units coupled to the input and the output, and means for controlling each unit of the plurality of units to adjust a power capacity of the UPS system based on a power availability, wherein the means for controlling is coupled to the plurality of units.

In some embodiments, the means for controlling may be further configured to obtain an actual power consumption by the load, determine a log based power schedule based on the actual power consumption, and determine the power availability based on the log based power schedule.

In some embodiments, the means for controlling may be further configured to compare the actual power consumption with a previous log based power schedule, set the log based power schedule to the actual power consumption in response to a determination that the actual power consumption is greater than or equal to the previous log based power schedule, and set the log based power schedule to be less than the previous log based power schedule in response to a determination that the actual power consumption is less than the previous log based power schedule.

In some embodiments, the UPS system may further comprise means for obtaining a user defined power schedule for the UPS system. The means for controlling may be further configured to compare the log based power schedule with the user defined power schedule, and set the power availability based on one of the log based power schedule and the user defined power schedule in response to comparing the log based power schedule with the user defined power schedule.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
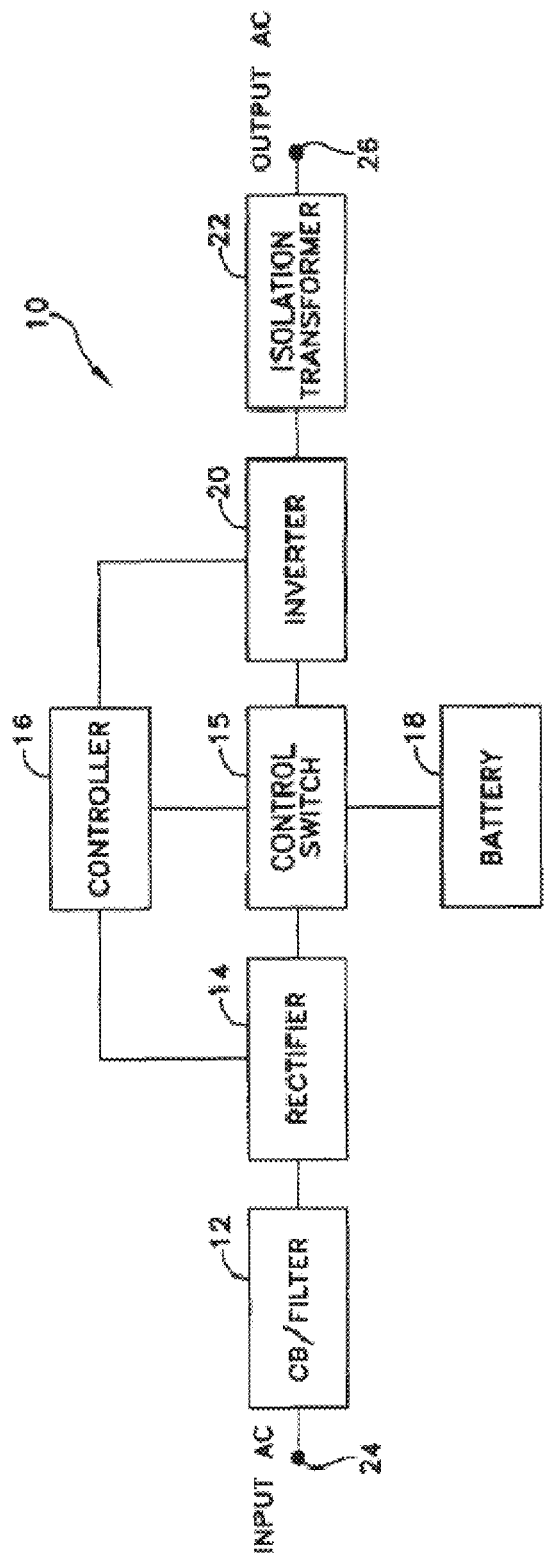
FIG. 1 is a block diagram of a prior art UPS system.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

A UPS system running at 100% power capacity is able to support a load equivalent to 100% of the system's power rating at all times. Being ready to handle this maximum load requires that all units, such as power modules of a modular UPS system, are running. DC-busses must be charged and all inverter components must be switching. However, maximum power availability may only be continuously needed in very few systems. Most often, maximum power availability is not required and a typical UPS may run at 50-60% load at all times. For example, a UPS system may be acquired to fit a specific predefined setup, which could be a data center installation where a given load of 100 KVA is being used and the UPS is dimensioned to fit a load of 200 KVA to allow for future expansions. This leaves the UPS running at 50% capacity with unutilized headroom resulting in wasted energy and money. In another example, a UPS in an office environment may have a utilization of 80% during office hours and the utilization may drop to 10% after office hours. This likewise results in large headroom after office hours, thereby wasting energy.

It is desirable to have a UPS system running at an efficiency that is as high as possible at all times, and to adapt to potential variations in the load. At least some aspects and embodiments are directed to methods and apparatuses for adaptively controlling UPS systems of the type having a plurality of units, such as a modular UPS system or a parallel UPS system, as will be described in further detail below. In one example, a unit may include a power module of a modular UPS system. In another example, a unit may include a UPS of a parallel UPS system.

To achieve energy savings when the load is smaller than the power capacity of a UPS system without reducing power reliability, one or more units such as power modules or parallel UPS units of the UPS system may be hibernated or powered off. In this way the load on each running unit is increased and the overall efficiency and power savings are increased. Energy savings may be realized by hibernating units that would otherwise be running with no load, thereby saving the energy consumed by units running with no load. Furthermore, energy savings may be realized due to the increased efficiency of the remaining active units as the load applied to those units increases. As the need for available power increases, one or more units may be activated to increase the power capacity of the UPS system. As used herein, hibernating a unit may include turning off the unit or putting the unit in a low power mode. Activating a unit may include turning on the unit or putting the unit in a high power mode.

Aspects and embodiments ensure the efficient utilization of a UPS at any time while ensuring sufficient power availability to the load, thereby saving energy. In various embodiments, maximum utilization of a UPS system may be achieved. For example, the power capacity of a UPS system may be adjusted to allow the UPS system to run near full power rating or power capacity to ensure maximum efficiency. In various embodiments, a UPS may adapt to the local power signature, achieving a continuous adaptive match between the UPS and the installation load. A UPS system may be configured to automatically determine and adjust the UPS system power capacity along with a user having the ability to overrule the determined power capacity. In various embodiments, a UPS system may be configured to adaptively adjust its power capacity or rating in accordance with power availability requirements determined based on historical power consumption and/or a user defined power schedule.

Various aspects are directed to determining a power availability level for a UPS system based on a combination of parameters. Power availability may be determined by using a self learning power scheduler model. The power capacity of the UPS system may then be adjusted according to the power availability schedule. This may include adjusting the load on individual units of the UPS system by allowing automatic unit turn off or standby. The power capacity of the UPS system may thus be dynamically varied. The power availability may be based on a combination of user defined power requirements and automatically learned power requirements. Learning power requirements may include logging actual power consumption in previous time periods and determining a log based power schedule based on the actual power consumption.

One or more features disclosed herein may be implemented in one or more controllers or apparatuses configured to control one or more UPS systems. In various embodiments, controllers disclosed herein may be included in one or more UPS systems or may be separate from one or more UPS systems being controlled. Example UPS systems upon which various aspects may be implemented and example UPS systems which may be controlled based on various aspects are discussed in more detail below.

Figure 2:
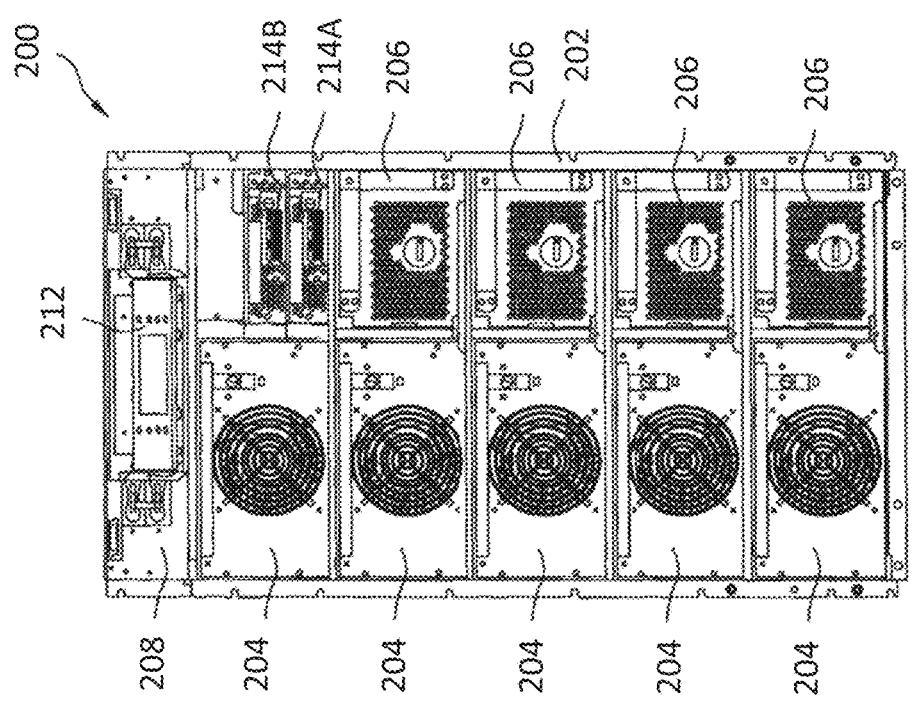
FIG. 2 is a front view of a modular UPS system according to aspects of the present disclosure.

FIG. 2 shows a front view of a modular UPS system 200 in accordance with one embodiment of the present disclosure. The modular UPS system 200 includes a number of components housed within a chassis 202. The primary components of the UPS system 200 include power modules 204, battery modules 206, an AC distribution module 208, a display module 212, a controller 214A, a redundant controller 214B and a communications module. In some embodiments, the controller 214A may be a main intelligence module and the redundant controller 214B may be a redundant intelligence module. The controller 214A and the redundant controller 214B may be configured to control the UPS system 200 according to one or more features disclosed herein. In other embodiments, the UPS system 200 may include a single controller according to aspects disclosed herein.

The communications module is not visible in FIG. 2, but in one embodiment the communications module is disposed in the frame behind the controller 214A and the redundant controller 214B. The communications module may provide the interface between either the controller or the redundant controller and a number of components such as external devices and the display module 212. The display module 212 provides the primary user interface to the UPS system 200. The UPS system 200 of FIG. 2 includes five power modules 204 and four battery modules 206. The particular number of power modules and battery modules used in a particular application may be selectable by a user depending on power and backup time required.

Figure 3:
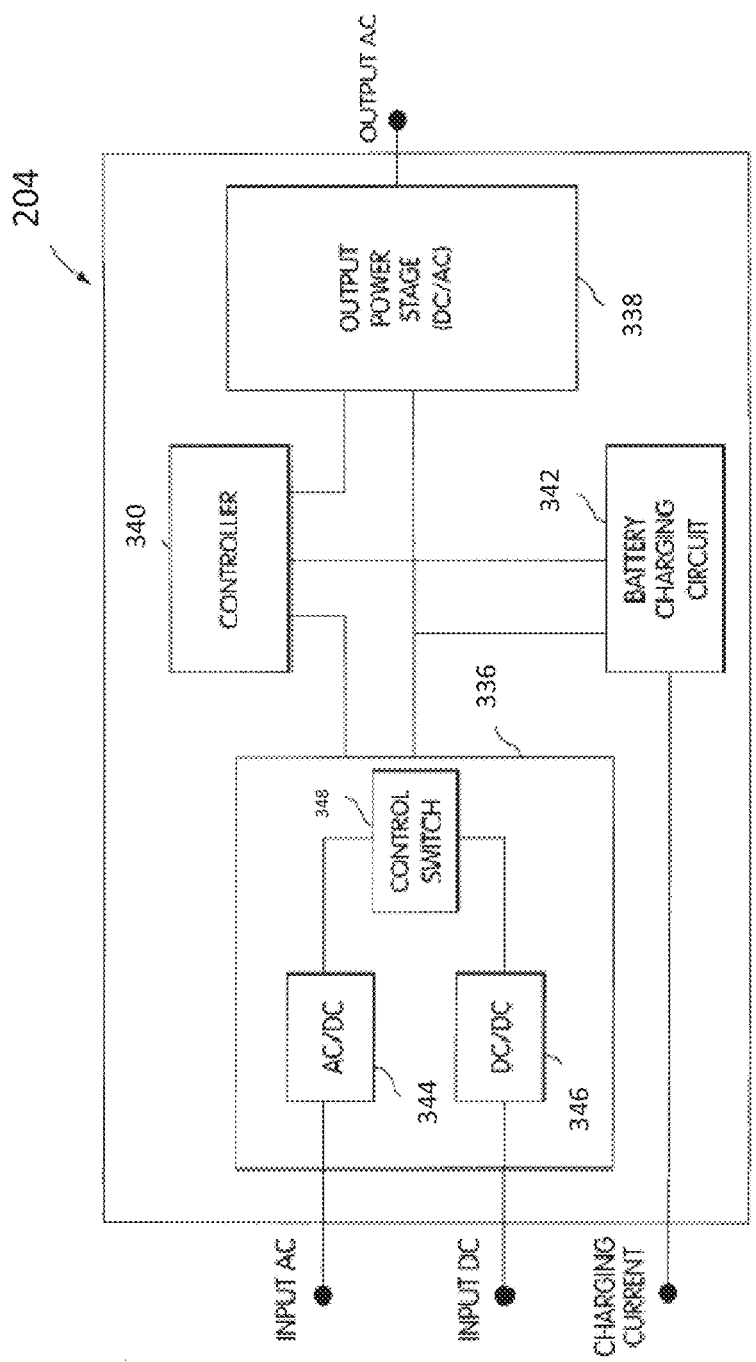
FIG. 3 is a functional block diagram of a power module used in the modular UPS system of FIG. 2 according to aspects of the present disclosure.

In one embodiment, the power modules 204 are substantially identical, and each performs the functions of an uninterruptible power supply (without the battery) under the control of the controller 214A or the redundant controller 214B. FIG. 3 is a functional block diagram of one of the power modules 204 showing the major functional blocks and interconnections. The power module 204 includes an input power stage 336, an output power stage 338, a controller 340 and a battery charging circuit 342. The input power stage 336 includes an AC/DC converter 344, a DC/DC converter 346 and a control switch 348. The AC/DC converter 344 receives the input AC power and converts the input AC power to DC power. The DC/DC converter 346 receives the DC battery power and modifies the voltage level to produce DC power at substantially the same voltage level as that generated by the AC/DC converter. The control switch 348, under the control of the controller 340, selects either the DC power from the AC/DC converter or the DC power from the DC/DC converter as the input power to the output stage 338. In one embodiment, the decision to switch to battery or line as the source power may be made individually by each power module. The output power stage 338 generates the output AC power from the DC power received from the input power stage. The battery charger circuit 342 generates charge current using the DC power from the AC/DC converter to charge the battery modules 206. The controller 340 controls operation of the input power stage 336, the output power stage 338 and the battery charging circuit 342. In addition, the controller 340 provides the primary interface in the power module to the controller 214A and the redundant controller 214B. The controller 340 is also configured to hibernate, turn off, activate and turn on the power module 204, for example based on input received from a master controller of the UPS system 200, such as the controller 214A.

In other embodiments, two or more UPS's may be electrically connected to form a single parallel UPS system with one output configured to be coupled to a load. In some embodiments of parallel UPS systems, the UPS's may communicate with each other directly (e.g., via a bus) to manage their joint operation in the parallel UPS system. In such a system, before the parallel UPS system is able to operate, the UPS's may need to exchange initial startup information to define how the UPS's will interact. In other embodiments of parallel UPS systems, the UPS's may utilize a master/controlled approach. In one master/controlled approach, a UPS is designated as a master UPS and the other UPS's are designated as controlled UPS's. The master UPS monitors the output voltage of its inverter (i.e., the output of the master UPS) and in response, generates an inverter current reference signal. Based on the inverter current reference signal, the master UPS controls the inverter to regulate its output. The master UPS also provides the inverter current reference signal to the controlled UPS's. The controlled UPS's share the load current based on the inverter current reference signal. Therefore, the master UPS controls the output of the entire parallel UPS system.

A parallel UPS system may be configured according to one or more features disclosed herein. In some embodiments, the parallel UPS system may include a master UPS having a controller configured according to aspects disclosed herein. The controller of the master UPS system may be coupled to one or more controlled UPS's and may be configured to provide control signals to hibernate, activate, turn on or turn off one or more controlled UPS's.

Figure 4:
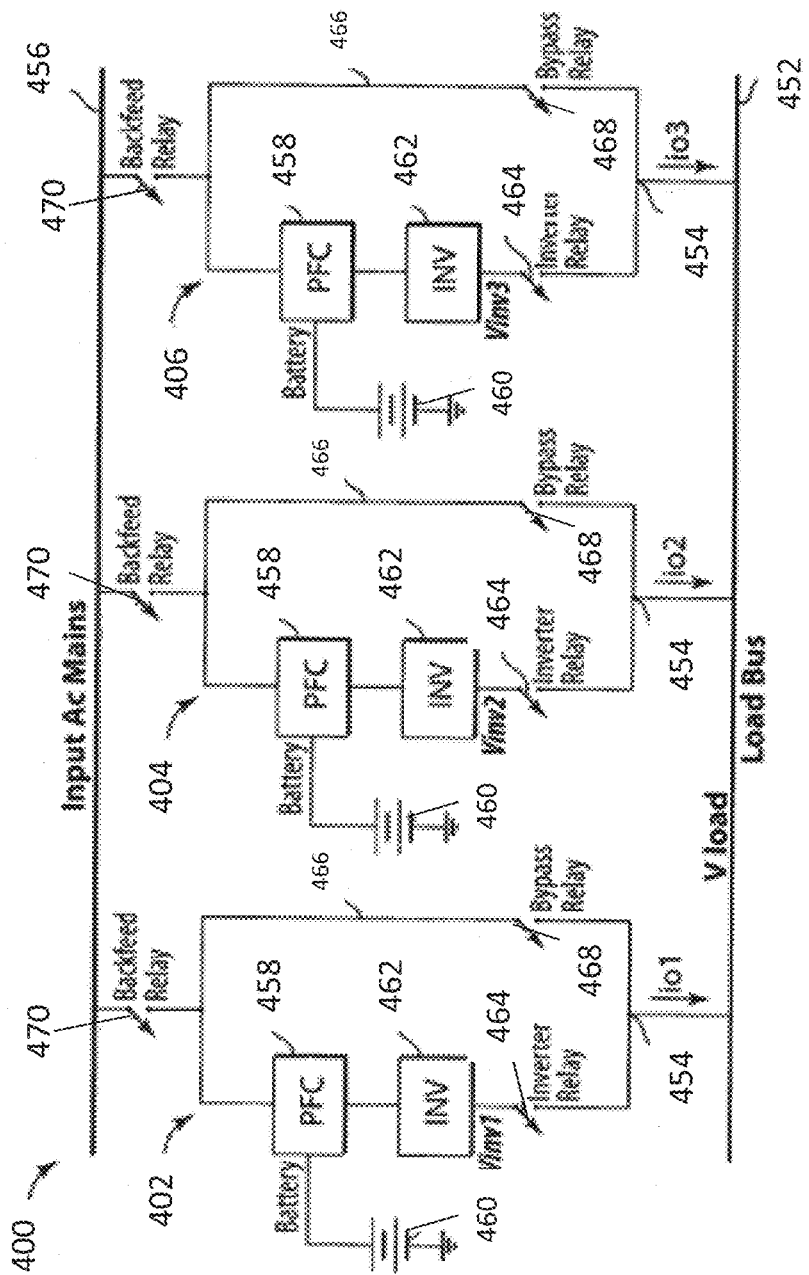
FIG. 4 is a block diagram of a parallel UPS system according to aspects of the present disclosure.

FIG. 4 is a block diagram of one example of a parallel UPS system 400. The parallel UPS system 400 includes a first UPS 402, a second UPS 404 and a third UPS 406, each coupled in parallel to provide power to a load bus 452 via a single output 454. In other embodiments, the UPS system 400 may include more or less than three UPS's. Each UPS 402, 404, 406 is coupled to input AC mains line 456. Within each UPS 402, 404, 406 a Power Factor Correction (PFC) circuit 458 is coupled to the AC mains line 456 and a battery 460. An inverter 462 is coupled to the PFC 458 and to the output 454 via an inverter relay 464. Each UPS 402, 404, 406 also includes a bypass line coupled between the input AC mains line 456 and the output 454 via a bypass relay 468. According to one embodiment, each UPS 402, 404, 406 also includes a backfeed relay 470 coupled to the input AC mains line 456 to provide backfeed protection.

Input AC power is provided by an external power source (e.g., a utility power source) to the input AC mains 456 and to each UPS 402, 404, 406. The PFC 458 of each UPS 402, 404, 406 converts the input AC power to DC power and provides the DC power to the inverter 462. According to one embodiment, where input AC power provided by the external power source is inadequate, each UPS 402, 404, 406 may instead receive DC power from a battery 460. The PFC 458 regulates the DC power from the battery and provides the DC power to the inverter 462.

The inverter 462 converts and regulates the received DC power into regulated AC power which is provided to the load bus 452. When regulation by the inverter 462 is not required or there is a problem with the inverter 462, unregulated power may be provided directly from the input AC mains line 456 to the output 454 via the bypass line 466. The inverter relay 464 and the bypass relay 468 are selectively controlled to determine whether each UPS 402, 404, 406 is operating regularly or in bypass mode.

According to one embodiment, one of the UPS's 402, 404, 406 is designated as the master UPS and controls the output of each one of the controlled UPS's inverters 462 to ensure that appropriate power is provided to the load bus 452 from each UPS. The master UPS may include a controller configured to hibernate, turn off, activate or turn on one or more controlled UPS's.

Figure 5:
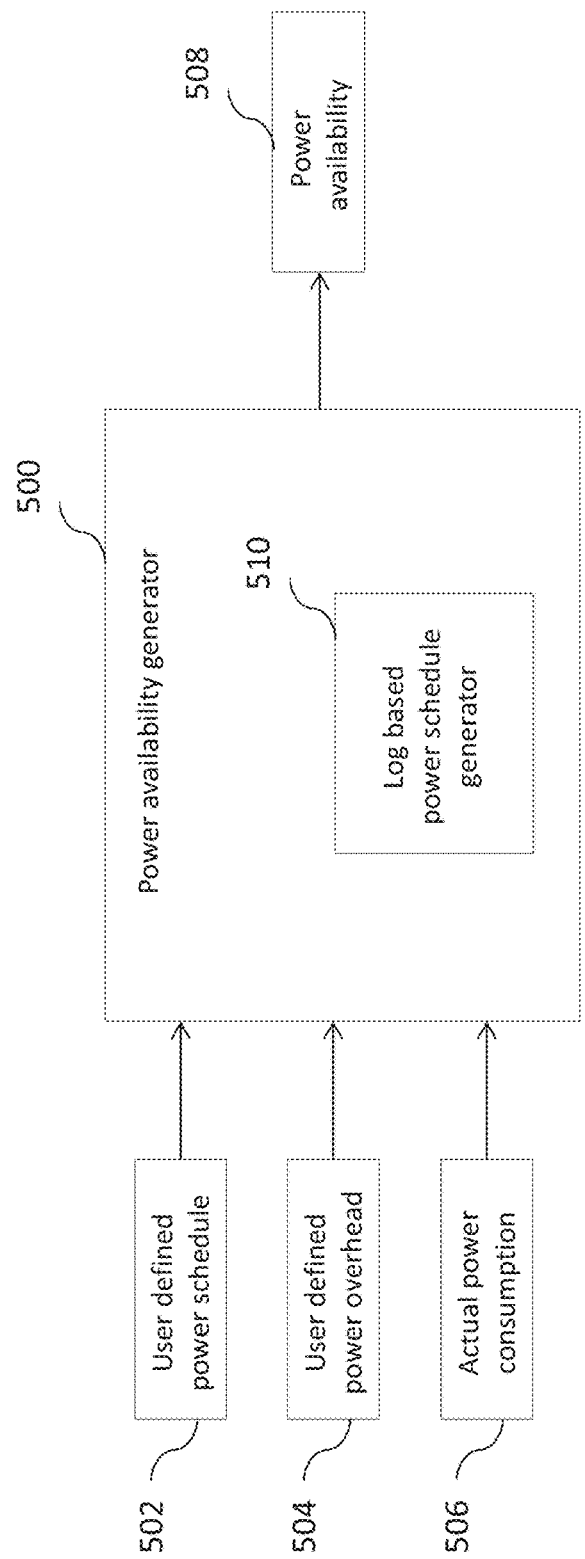
FIG. 5 is a block diagram illustrating inputs and output of one embodiment of a power availability generator according to aspects of the present disclosure.

FIG. 5 is a block diagram of one embodiment of a power availability generator 500, illustrating its inputs and output. The power availability generator 500 is configured to determine a required power level that must be available to a load by a UPS system. The power availability generator 500 is shown to have three inputs and one output. The inputs include a user defined power schedule 502, a user defined power overhead 504 and an actual power consumption 506. The output is the power availability 508. The user defined power schedule 502 may be a minimum power that must be available to the load by the UPS system, as defined by a user of the UPS system. The user defined power overhead 504 may be specified by a user as additional power that must be available to the load, for example to handle an increased power requirement of the load. The actual power consumption 506 may include a log of historical and current power consumption levels by the load. The power availability generator 500 is based on a power availability model. The power availability model uses the input parameters 502, 504 and 506 to determine the needed power availability 508 at any given time.

The power availability generator 500 includes a log based power schedule generator 510. The log based power schedule generator 510 may be configured to determine a log based power schedule using logs of actual power consumption 506, as will be described in further detail below. The power availability 508 may be then determined based on the user defined inputs 502, 504 and the log based power schedule. The determined power availability may then be used to control the shutdown and activation of one or more units of a UPS system.

The power availability generator 500 may be included in a UPS system or a controller configured to control the activation and deactivation of a plurality of units of the UPS system. A controller may be configured to continuously determine a precise number of units to hibernate and/or activate based on the power availability, to step up the efficiency of the UPS system at all times. Thus, embodiments of an adaptive power availability controller can ensure that the UPS system efficiency is at its maximum, while also being prepared for any instantaneous load increases, calling for more needed active units. Based on continuously determining the power availability that is required for the UPS system, a controller may continuously adjust the power rating of the UPS system to keep the load percentage of the full power rating as high as possible at all times, by continuously hibernating and activating units. This will ensure sufficient power availability, while letting the UPS run at its maximum efficiency rate.

In one embodiment, the power availability generator 500 may be included in the controller 214A of the modular UPS system 200 of FIG. 2. The controller 214A may be configured to control the power modules 204 and to hibernate or activate one or more power modules based on the power availability determined by the power availability generator 500. In another embodiment, the power availability generator 500 may be included in the master UPS of the parallel UPS system 400 of FIG. 4. For example, the master UPS may be UPS 402 and a controller of the master UPS may be configured to control the other UPS's 404 and 406 and to hibernate or activate the UPS's based on the power availability determined by the power availability generator 500.

In various embodiments, a UPS system may be configured to allow a user of the UPS system, such as a field service engineer (FSE), to setup the system by providing inputs to the power availability generator 500. For example, a user may provide the user defined power schedule 502. A user may also provide the user defined power overhead 504. In some embodiments, a user may be allowed to enable and disable one or more features of the UPS system. For example, a user may disable the user defined power schedule 502 or the log based power schedule generator 510. If the user defined power schedule 502 is disabled, the power availability generator 500 may automatically determine the power availability 508 based only on the logs of actual power consumption 506 using the log based power schedule generator 510. If the user disables the log based power schedule generator 510 instead, the power availability generator 500 may determine the available power 508 based on the user defined inputs 502, 504. In various embodiments, a user may also enable or disable the automatic shutdown of one or more units of the UPS system.

The user defined power schedule may be a calendar based power scheme. The calendar may include any time period, such as a 24 hour period or a time period of multiple days. In one example, a user may define a power schedule by specifying a minimum available power for each hour in a 24 hours and 7 days calendar setup accessed via a user interface. Providing a user defined power schedule allows a user with specific knowledge of the UPS system load and sudden changes in load to use this information to ensure power capacity. It may also allow a user to control the power availability of the UPS system.

Figure 6:
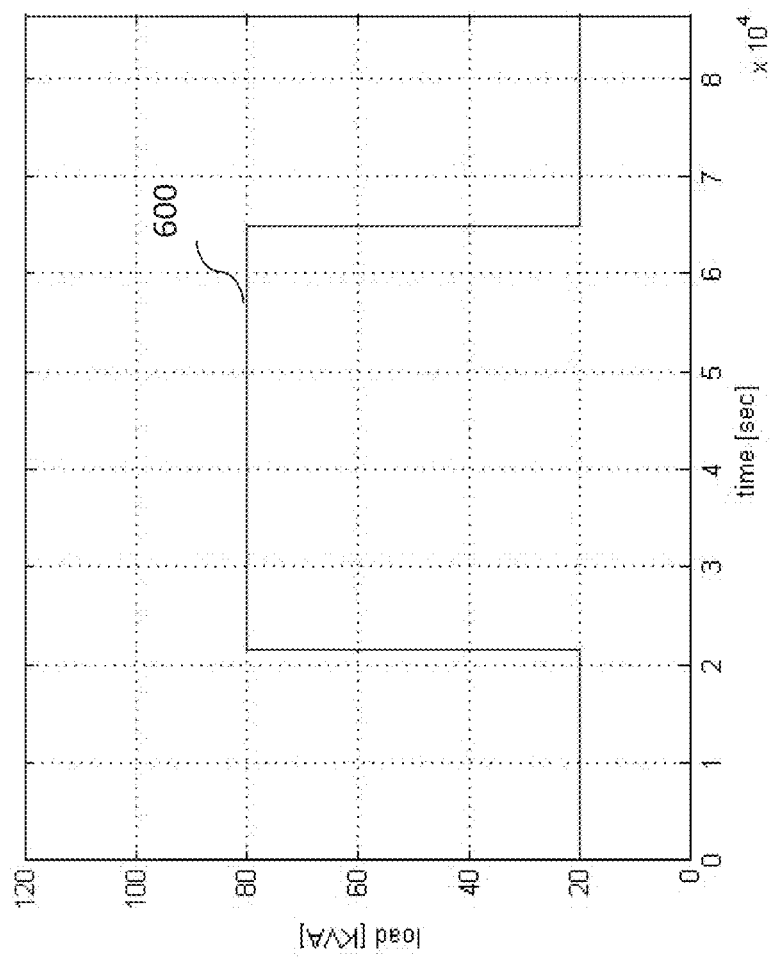
FIG. 6 is a graph of one example of a user defined power schedule according to aspects of the present disclosure.

FIG. 6 shows a graph of one example of a user defined power schedule 600 covering a period of 24 hours. The vertical axis represents the load in KVA and the horizontal axis represents time in seconds. According to the user defined power schedule 600, a 120 KVA system is expecting a load of 20 KVA at night (from 6 pm to 6 am) and a load of 80 KVA during working hours (from 6 am to 6 pm). The user defined power schedule may be provided by the user to specify the minimum available power at each specified time in the schedule.

As described above, providing a user defined power schedule is not mandatory. A user may determine if a UPS system is to be controlled based on the user defined power schedule or if this is to be disabled. Disabling the user defined power schedule option means that the system will rely on the log based power scheduler, such as the log based power schedule generator 510 shown in FIG. 5.

A power overhead may also be defined by a user of the UPS system. The user defined power overhead may be a minimum power overhead. This overhead may act as a margin between the actual power consumption and the power available from the UPS system. For example, if the power overhead is set at 10 KVA by a user, then the UPS power capacity and the available power must be a minimum of 10 KVA greater than the actual power consumption. For a UPS system generating 80 KVA to support the load, the UPS system must have a power capacity of at least 90 KVA provided by running units to meet the 10 KVA power overhead requirement.

Figure 7:
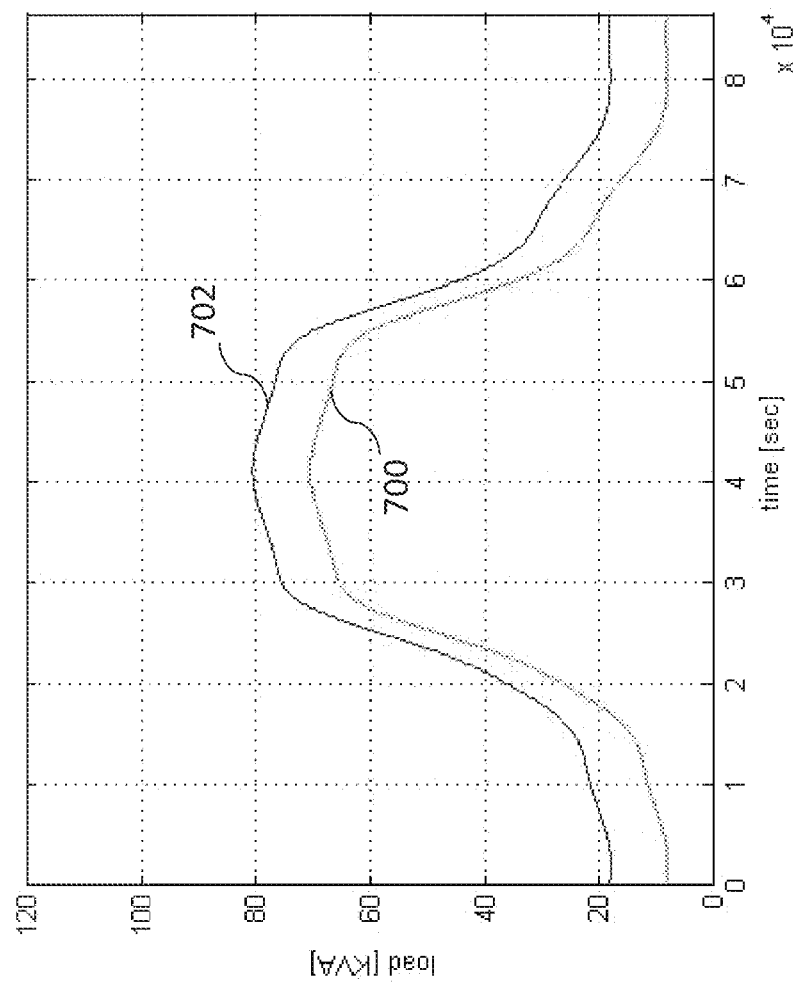
FIG. 7 is a graph illustrating an example of power consumption and a user defined power overhead according to aspects of the present disclosure.

FIG. 7 is a graph illustrating an example of actual power consumption 700 over a time period of 24 hours. The graph further illustrates the minimum power 702 required based on a user defined power overhead of 10 KVA. The difference between the minimum required power 702 and the actual power consumption 700 is the user defined power overhead of 10 KVA.

As described above with reference to FIG. 5, a UPS system may include a log based power schedule generator. The UPS system may include a logging module configured to log actual power consumption. In some embodiments, a log based power schedule generator may be configured to generate and store an averaged load scenario over a continuous period, for example by using logs of actual power consumption. A user may select whether to use a log based power schedule to determine the power availability. In some embodiments, the power availability may be determined based on both the log based power schedule and a user defined power schedule. In other embodiments, the power availability may be determined based only on the log based power schedule.

In some embodiments, determining power availability for the UPS system based on the log based power schedule alone may be more efficient than using both the log based and user defined power schedules. The system may be configured to automatically determine the optimal power that must be available based on the log based power schedule alone. In some embodiments, using both log based and user defined power schedules may allow a user to have control over the minimum actual power provided by the UPS system, thus providing a UPS system having user configurable power availability.

Figure 8:
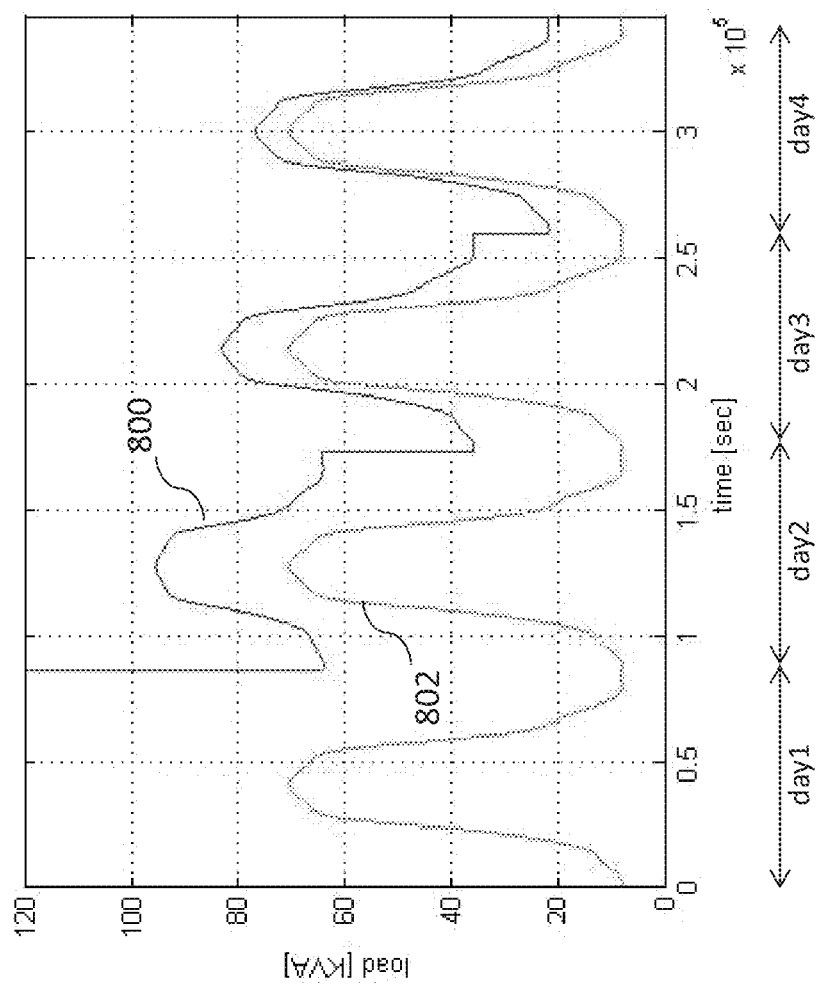
FIG. 8 is a graph illustrating one example of generation of a log based power schedule based on logs of actual power consumption according to aspects of the present disclosure.

FIG. 8 shows a graph of one example of a log based power schedule 800 generated based on logs of actual power consumption 802 over a period of 4 days. The power usage increases each day from a low level during night hours to a high level during working hours, as shown by the actual power consumption 802. The log based power schedule 800 is initially set to the maximum power rating, which is 120 KVA in this example, as shown during the first 24 hours in FIG. 8. The log based power schedule 800 adapts to the actual load over time as shown in FIG. 8. The log based power schedule 800 improves over time as more data on actual power consumption 802 is logged and used to learn the log based power schedule. Thus, in this example, the log based power schedule 800 slowly decreases to match the actual power consumption 802. A user may therefore experience that the efficiency of the UPS system increases over time as one or more units of the UPS system are controlled in response to generating an improved log based power schedule that better matches the actual power consumption.

Figure 9:
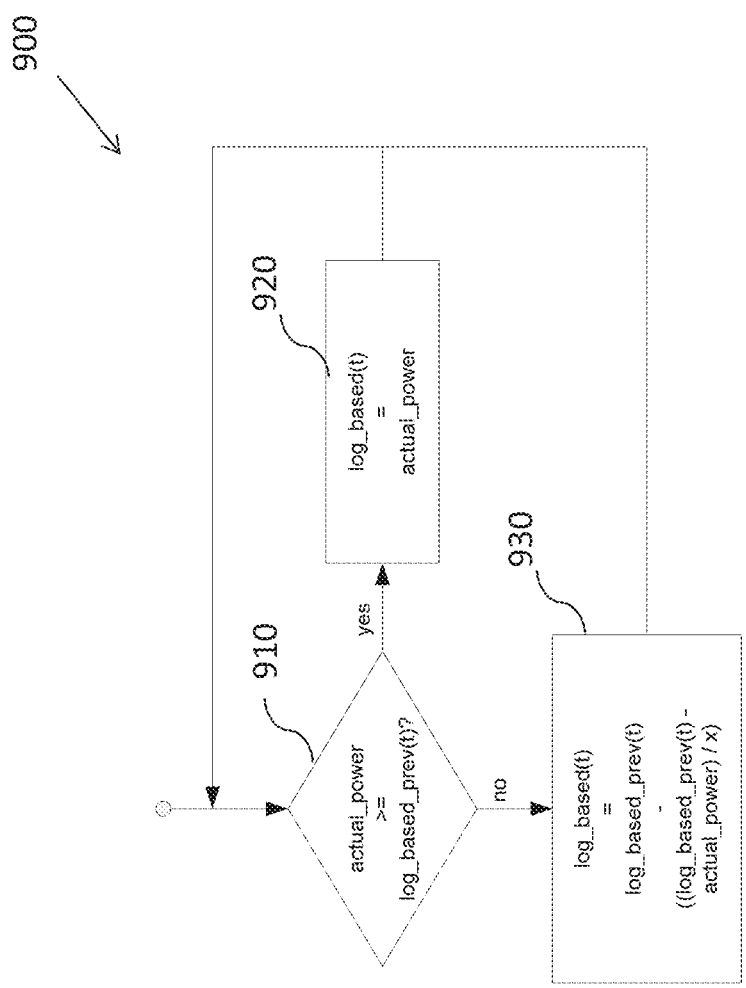
FIG. 9 is a flow chart of one example of a method of generating a log based power schedule according to aspects of the present disclosure.

FIG. 9 shows a flow chart of one example of a method 900 of determining a log based power schedule according to aspects of the present disclosure. The method 900 includes comparing the actual power consumption (actual_power) with a previous log based power schedule (log_based_prev(t)) at block 910. The previous log based power schedule may be a log based power schedule that is previously determined, for example based on a log of historical actual power consumption. In one example, the previous log based power schedule may be an initially set log based power schedule. In another example, the previous log based power schedule may correspond to the log based power schedule of a previous day.

Comparing the actual power consumption with the previous log based power schedule may include determining whether the actual power consumption is greater than or equal to the previous log based power schedule as shown at block 910 (actual_power>=log_based_prev(t)?). The method 900 further includes determining the log based power schedule (log_based(t)) based on a result of the comparing act of block 910. In some embodiments, the log based power schedule at a given time may first be set to a previous log based power schedule that corresponds to the given time but in a previous day. This log based power schedule may then be compared with the actual power consumption and updated in response to the comparison.

The method 900 includes setting the log based power schedule (log_based(t)) to the actual power consumption (actual_power) at block 920 (log_based(t)=actual_power) in response to determining that the actual power consumption is greater than or equal to the previous log based power schedule. That is, the actual power consumed is compared to the logged power level. If the log based level is less than the actual power, then the log based power is instantaneously corrected. The method 900 also includes setting the log based power schedule to be less than the previous log based power schedule at block 930 in response to determining that the actual power consumption is less than the previous log based power schedule. That is, if the logged power level is greater than the actual power consumption, then the log based power is gradually reduced to approach the actual power. In method 900, the log based power schedule (log_based(t)) is reduced relative to the previous log based power schedule (log_based_previous(t)) by subtracting a fraction of the difference between the previous log based power schedule and the actual power consumption from the previous log based power schedule at block 930 (log_based(t) =log_based_prev(t)−((log_based_prev(t)−actual_power)/ x)). The fraction by which the log based power schedule is reduced may be predetermined or specified by a user, for example by specifying the factor x.

Referring now to FIGS. 8 and 9, one example of updating the log based power schedule according to block 930 is shown in FIG. 8, where the log based power schedule on day 4 is set by reducing the previous log based power schedule, where the previous log based power schedule corresponds to day 3. More specifically, the log based power schedule 800 on day 4 is set by subtracting a fraction of the difference between the previous day's (day 3) log based power schedule 800 and the actual power consumption 802 from the previous day's (day 3) log based power schedule. The fraction in this example is half, corresponding to a factor of x=2 at block 930. Therefore, the difference between the log based power schedule 800 on day 4 and the log based power schedule 800 on day 3 is half of the difference between the log based power schedule on day 3 and the actual power consumption.

The method 900 of FIG. 9 may further include other acts not shown in FIG. 9. For example, method 900 may further include an act of obtaining actual power consumption. In various embodiments, the method 900 may be continuously applied to continuously determine a log based power schedule. The log based power schedule may be continuously updated in response to receiving actual power consumption data to better adapt to the actual power consumption. In various embodiments, other criteria and methods of determining a log based power schedule may be used.

Figure 10:
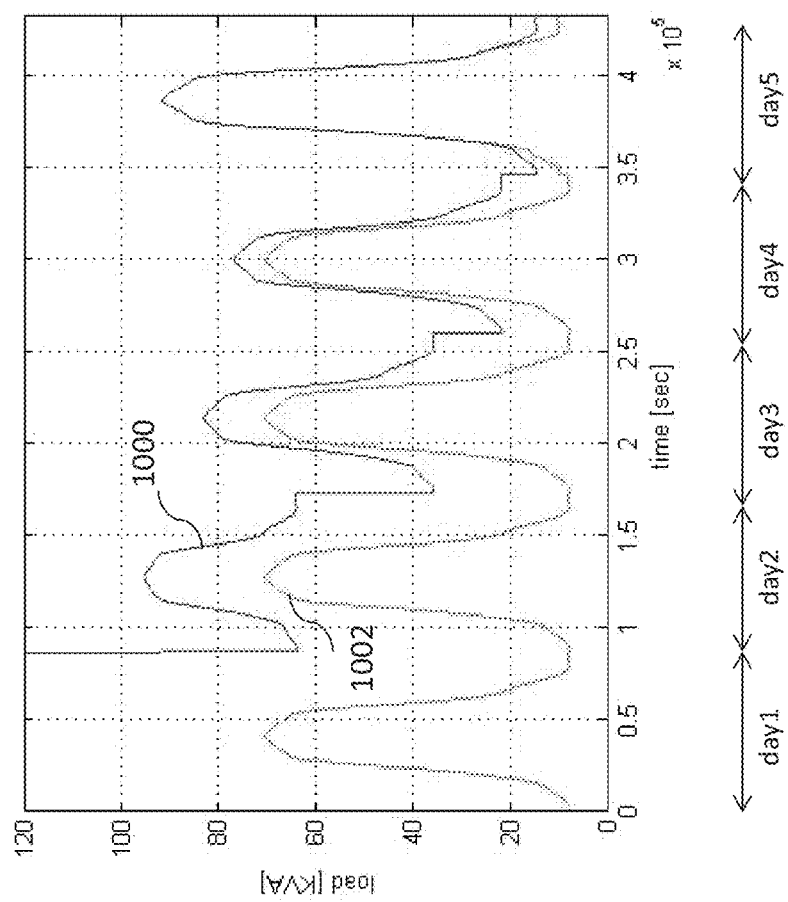
FIG. 10 is a graph illustrating another example of generation of a log based power schedule based on logs of actual power consumption according to aspects of the present disclosure.

FIG. 10 shows a graph illustrating another example of a log based power schedule 1000 generated based on logs of actual power consumption 1002 over a period of 5 days. The actual power consumption is identical for each of the first 4 days. On day 5, the load is suddenly increased. The log based power schedule 1000 is generated by applying the method 900 of FIG. 9 using the actual power consumption 1002.

Referring now to FIGS. 9 and 10, during the first four days, the actual power consumption 1002 is less than the previous day's log based power schedule 1000 at any given time. Therefore, the log based power schedule 1000 is gradually reduced during the first four days according to block 930 of the method 900. For day 1, the previous log based power schedule may be an initially set log based power schedule such as a power schedule equal to the maximum power capacity of the UPS system. On day 5, due to the increase in the actual power consumption 1002, the actual power consumption is greater than the previous day's (day 4) log based power schedule. Therefore, according to block 920 of the method 900, the log based power schedule 1000 is set to be equal to the actual power consumption 1002 on day 5, as shown in FIG. 10. Thus, after four days of learning the log based power schedule with identical power consumption, a log based power schedule generator may adapt to changes in load by instantaneously correcting the log based power schedule according to the increased power consumption.

Figure 11:
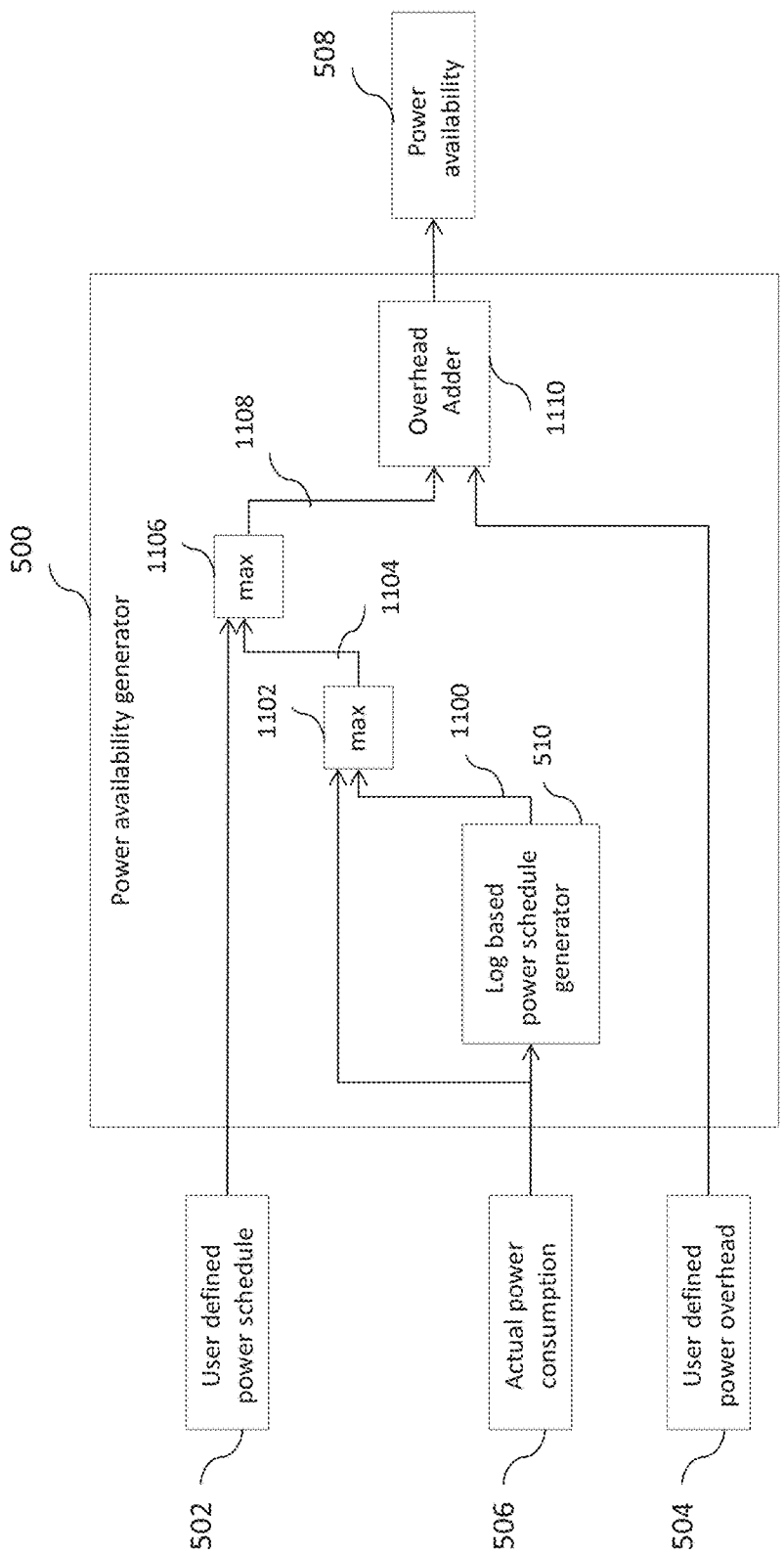
FIG. 11 is a block diagram of the power availability generator of FIG. 5 according to aspects of the present disclosure.

FIG. 11 shows a block diagram illustrating further details of the power availability generator 500 of FIG. 5. As discussed above with reference to FIG. 5, the inputs to the power availability generator 500 include a user defined power schedule 502, a user defined power overhead 504 and an actual power consumption 506. The output is the power availability 508. The power availability generator 500 includes a log based power schedule generator 510. The log based power schedule generator 510 may be configured, for example, to perform the method 900 of FIG. 9. As shown in FIG. 11, the actual power consumption 506 is input to the log based power schedule generator 510. The log based power schedule generator 510 is configured to determine and output a log based power schedule 1100 using the actual power consumption 506.

The power availability 508 may be determined based on the user defined inputs 502, 504 and the log based power schedule 1100. In the embodiment of FIG. 11, the log based power schedule 1100 is compared with the actual power consumption 506 at block 1102. The output 1104 of block 1102 is the maximum of the actual power consumption 506 and the log based power schedule 1100. The output 1104 is then compared with the user defined power schedule 502 at block 1106. The output 1108 of block 1106 is the maximum of the user defined power schedule 502 and the output 1104 of block 1102. Thus, the output 1108 is a result of comparison of the user defined power schedule 502 with the log based power schedule 1100. The power availability generator 500 also includes an overhead adder 1110 configured to add the user defined power overhead 504 to the output 1108 to generate the power availability 508.

The determined power availability 508 may be used to control the shutdown and activation of one or more units of a UPS system. The power availability 508 dictates the number of units such as power modules or UPS's in active mode. If a trend of sudden increase in needed power is determined, the power availability increases and more units must be turned on to support the increased power requirement.

Figure 12:
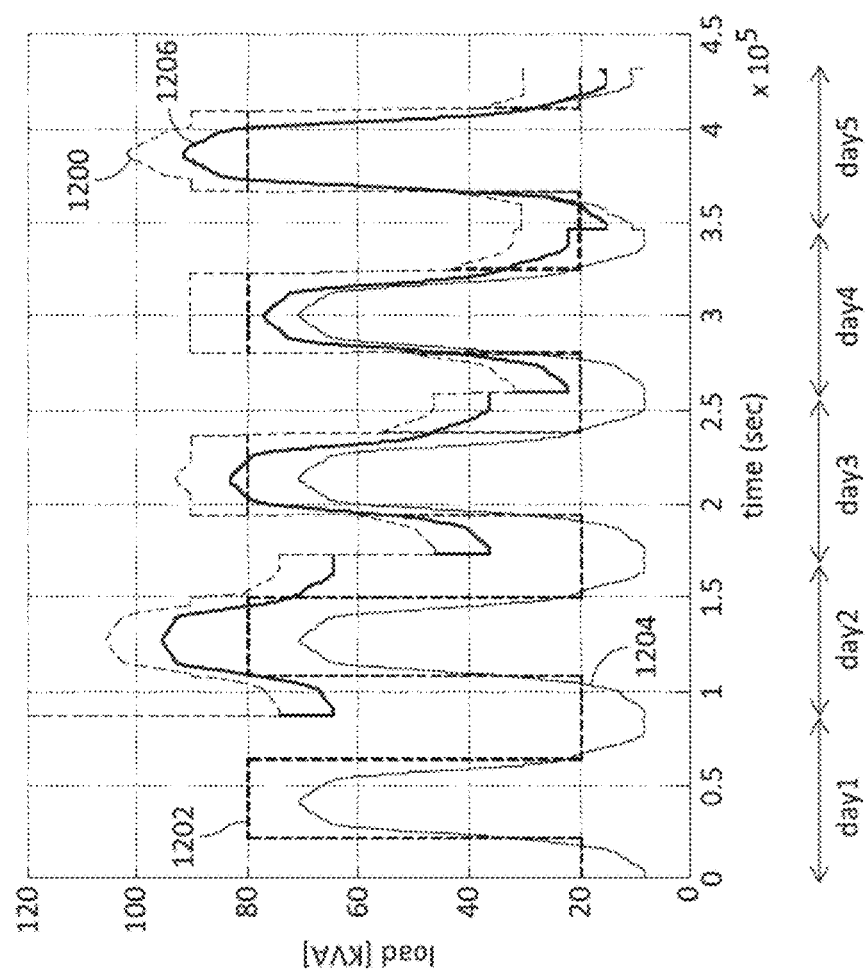
FIG. 12 is a graph illustrating one example of a power availability schedule generated based on a user defined power schedule, actual power consumption log and log based power schedule, according to aspects of the present disclosure.

FIG. 12 is a graph illustrating one example of power availability 1200 generated based on a user defined power schedule 1202, actual power consumption 1204 and log based power schedule 1206 over a period of 5 days. The actual power consumption 1204 is identical for the first four days and increases on day 5. As described above, the log based power schedule 1206 gradually decreases during the first four days and increases on day 5 to match the increased power consumption.

The power availability 1200 is initially set to the maximum power capacity (120 KVA) during day 1. The power availability 1200 decreases after the first day to adapt to the actual power consumption 1204. At any given time, the user defined power schedule 1202 is compared with the log based power schedule 1206 and the power availability 1200 is determined based on the maximum of the user defined and log based power schedules. For example, on day 3, the user defined power schedule 1202 mostly dominates the log based power schedule 1206 and thus controls the power availability 1200. On day 4, the user defined power schedule 1202 controls the power availability 1200. On day 5, the actual power consumption 1204 is increased, resulting in an increase of the log based power schedule 1206. Thus, the log based power schedule 1206 exceeds the user defined power schedule 1202 and controls the power availability 1200 on day 5. Furthermore, the power availability exceeds the maximum of the user defined and log based power schedules by the user defined power overhead of 10 KVA.

Figure 13:
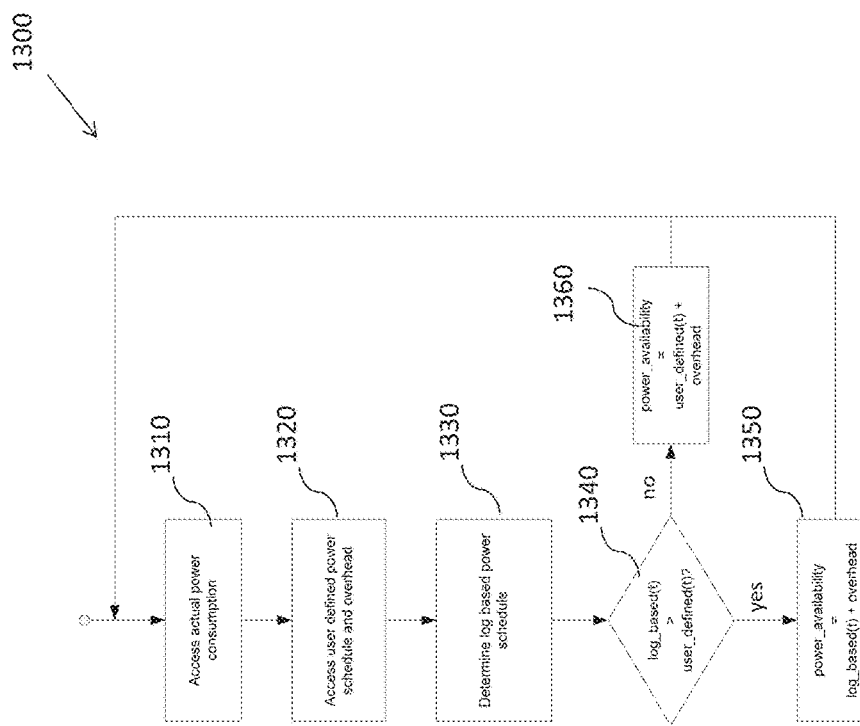
FIG. 13 is a flow chart of one example of a method of generating a power availability schedule based on user defined and log based power schedules according to aspects of the present disclosure.

FIG. 13 shows a flow chart of one example of a method 1300 of determining power availability for a UPS system based on both user defined and log based power schedules. The method 1300 includes an act of accessing or obtaining actual power consumption by a load coupled to the UPS system at block 1310. Accessing the actual power consumed by the load may include waiting for a time period x and collecting actual power consumption during that time period. The method 1300 further includes an act of accessing or obtaining user defined inputs at block 1320. The user defined inputs include the user defined power schedule and the user defined power overhead. The method 1300 further includes an act of determining the log based power schedule at block 1330. For example, determining the log based power schedule may include performing the method 900 of FIG. 9. Determining the log based power schedule may be performed in response to obtaining the actual power consumption at block 1310.

It is to be appreciated that one or more acts of the method 1300, such as acts 1310, 1320 and 1330, may be performed in a different order. In one embodiment, the acts of accessing actual power consumption, user defined inputs and determining the log based power schedule are included in the method 1300. In other embodiments, the respective outputs of performing these acts may be input to the method of determining power availability.

The method 1300 further includes an act of comparing, at block 1340, the log based power schedule (log_based(t)) determined at block 1330 with the user defined power schedule (user_defined(t)) obtained at block 1320. The act of comparing may be performed for a current time t. The act of comparing may include determining whether the log based power schedule is greater than the user defined power schedule (log_based(t)>user_defined(t)?) as shown at block 1340.

The method 1300 further includes determining the power availability for the UPS system based on a result of the comparing act. In particular, the method 1300 includes an act of setting the power availability based on the user defined power overhead and one of the log based power schedule and the user defined power schedule in response to the comparing. For example, if the log based power schedule is determined to be greater than the user defined power schedule, the power availability is set based on the log based power schedule and the user defined power overhead (e.g., power_availability=log_based(t)+overhead) at block 1350. If the log based power schedule is determined not to be greater than the user defined power schedule, the power availability is set based on the user defined power schedule and the user defined power overhead (e.g., power_availability=user_defined(t)+overhead) at block 1360.

In some embodiments, the method 1300 may be included in a method of controlling a UPS system according to aspects disclosed herein. In other embodiments, the power availability generated by the method 1300 may be input to a method of controlling the UPS system. The method of controlling a UPS system having a plurality of units may include adjusting the power capacity of the UPS system based on the power availability. For example, the power capacity of the UPS system may be adjusted by hibernating or activating at least one unit of the UPS system.

A sudden and unexpected increase of needed power may be handled by initiating boot up of additional units of the UPS system. In some cases, during the boot up period, the active units may be overloaded to compensate for the sudden increase. In some embodiments, to handle a fluctuation of power consumption the shutdown sequence of units may be delayed compared to the actual consumption. The log based power schedule may then reflect this increase of needed power at the given time.

Various aspects and functions described herein may be implemented in one or more controllers or apparatuses configured to control one or more UPS systems. In various embodiments, controllers disclosed herein may be included in one or more UPS systems or may be separate from one or more UPS systems being controlled.

Furthermore, various aspects and functions described herein in accord with the present disclosure may be implemented as hardware, software, or a combination of hardware and software on one or more computer systems. The one or more computer systems may be configured to communicate with the one or more UPS systems being controlled. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among a plurality of computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the invention is not limited to any particular distributed architecture, network, or communication protocol. Furthermore, aspects in accord with the present invention may be implemented as specially-programmed hardware and/or software.

Figure 14:
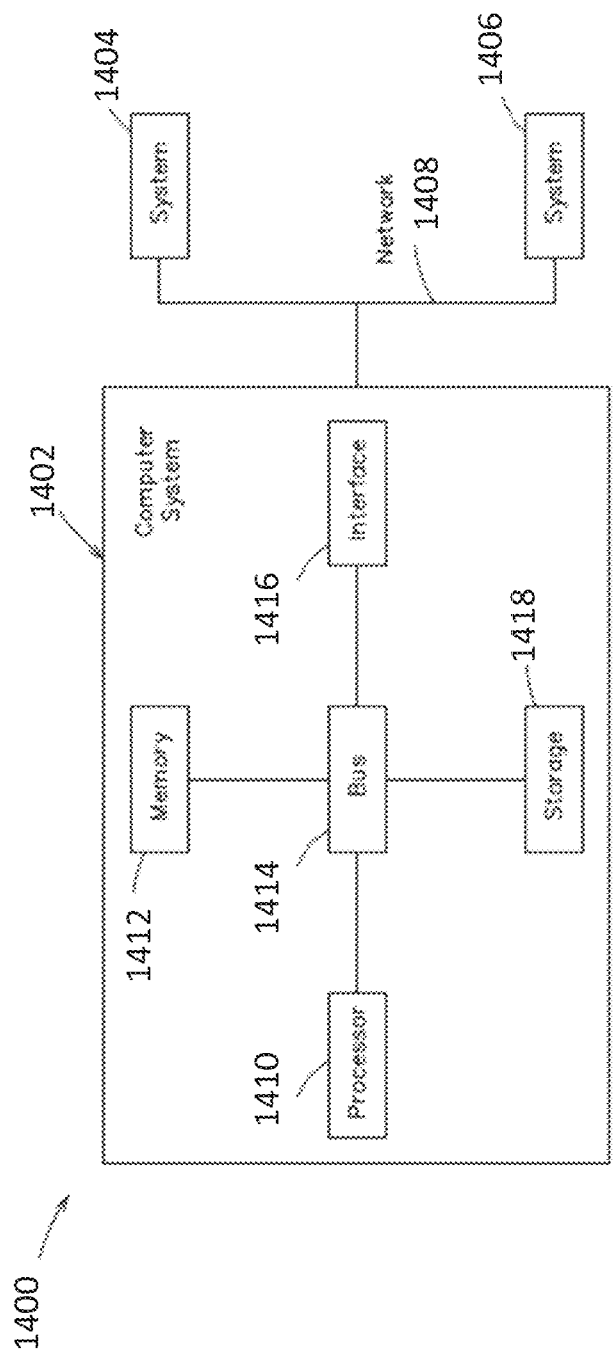
FIG. 14 is a block diagram of one example of a computer system upon which various aspects of the present embodiments may be implemented.

FIG. 14 shows a block diagram of a distributed computer system 1400, in which various aspects and functions in accord with the present invention may be practiced. The distributed computer system 1400 may include one more computer systems. For example, as illustrated, the distributed computer system 1400 includes three computer systems 1402, 1404 and 1406. As shown, the computer systems 1402, 1404 and 1406 are interconnected by, and may exchange data through, a communication network 1408. The network 1408 may include any communication network through which computer systems may exchange data. To exchange data via the network 1408, the computer systems 1402, 1404 and 1406 and the network 1408 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM, and Web Services. To ensure data transfer is secure, the computer systems 1402, 1404 and 1406 may transmit data via the network 1408 using a variety of security measures including TSL, SSL, or VPN, among other security techniques. While the distributed computer system 1400 illustrates three networked computer systems, the distributed computer system 1400 may include any number of computer systems, networked using any medium and communication protocol.

Various aspects and functions in accord with the present invention may be implemented as specialized hardware or software executing in one or more UPS systems and/or in one or more computer systems including the computer system 1402 shown in FIG. 14. As depicted, the computer system 1402 includes a processor 1410, a memory 1412, a bus 1414, an interface 1416 and a storage system 1418. The processor 1410, which may include one or more microprocessors or other types of controllers, can perform a series of instructions that manipulate data. The processor 1410 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. The processor 1410 may be a mobile device or smart phone processor, such as an ARM Cortex processor, a Qualcomm Snapdragon processor, or an Apple processor. As shown, the processor 1410 is connected to other system placements, including a memory 1412, by the bus 1414.

The memory 1412 may be used for storing programs and data during operation of the computer system 1402. Thus, the memory 1412 may be a relatively high performance, volatile, random access memory such as a dynamic random access memory (DRAM) or static memory (SRAM). However, the memory 1412 may include any device for storing data, such as a disk drive or other non-volatile storage device, such as flash memory or phase-change memory (PCM). Various embodiments in accord with the present invention can organize the memory 1412 into particularized and, in some cases, unique structures to perform the aspects and functions disclosed herein.

Components of the computer system 1402 may be coupled by an interconnection element such as the bus 1414. The bus 1414 may include one or more physical busses (for example, busses between components that are integrated within a same machine), and may include any communication coupling between system placements including specialized or standard computing bus technologies such as IDE, SCSI, PCI and InfiniBand. Thus, the bus 1414 enables communications (for example, data and instructions) to be exchanged between system components of the computer system 1402.

Computer system 1402 also includes one or more interface devices 1416 such as input devices, output devices, and combination input/output devices. The interface devices 1416 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 1416 allow the computer system 1402 to exchange information and communicate with external entities, such as users, UPS systems and other systems.

Storage system 1418 may include a computer-readable and computer-writeable nonvolatile storage medium in which instructions are stored that define a program to be executed by the processor. The storage system 1418 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk, or flash memory, among others. In operation, the processor 1410 or some other controller may cause data to be read from the nonvolatile recording medium into another memory, such as the memory 1412, that allows for faster access to the information by the processor 1410 than does the storage medium included in the storage system 1418. The memory may be located in the storage system 1418 or in the memory 1412. The processor 1410 may manipulate the data within the memory 1412, and then copy the data to the medium associated with the storage system 1418 after processing is completed. A variety of components may manage data movement between the medium and the memory 1412, and the invention is not limited thereto.

Further, the invention is not limited to a particular memory system or storage system. Although the computer system 1402 is shown by way of example as one type of computer system upon which various aspects and functions in accord with the present invention may be practiced, aspects of the invention are not limited to being implemented on the computer system shown in FIG. 14. Various aspects and functions in accord with the present invention may be practiced on one or more computers having different architectures or components than that shown in FIG. 14. For instance, the computer system 1402 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 1402 may include an operating system that manages at least a portion of the hardware placements included in computer system 1402. A processor or controller, such as processor 1410, may execute an operating system which may be, among others, a Windows-based operating system (for example, Windows NT, Windows 2000/ME, Windows XP, Windows 7or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. The operating system may be a mobile device or smart phone operating system, such as Windows Mobile, Android, or iOS. Many other operating systems may be used, and embodiments are not limited to any particular operating system. The computer system 1402 may include a virtualization feature that hosts the operating system inside a virtual machine (i.e. a simulated physical machine). Various components of a system architecture could reside on individual instances of operating systems inside separate "virtual machines", thus running somewhat insulated from each other.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

A computer system included within an embodiment may perform functions outside the scope of the invention. For instance, aspects of the system may be implemented using an existing product. Aspects of the system may be implemented on database management systems such as SQL Server available from Microsoft of Seattle, Wash.; Oracle Database from Oracle of Redwood Shores, Calif.; and MySQL from Sun Microsystems of Santa Clara, Calif.; or integration software such as WebSphere middleware from IBM of Armonk, N.Y. However, a computer system running, for example, SQL Server may be able to support both aspects in accord with the present invention and databases for sundry applications not within the scope of the invention.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure.

Accordingly, the foregoing description and drawings are by way of example only, and the scope of the disclosure should be determined from proper construction of the appended claims, and their equivalents.

What is claimed is:

1. A method of controlling a UPS (Uninterruptible Power Supply) system having a plurality of units using a controller, the method comprising:
obtaining an actual power consumption over a continuous period by a load coupled to the UPS system;
determining a log based power schedule in response to obtaining the actual power consumption over the continuous period;
determining a power availability for the UPS system in response to determining the log based power schedule; and
adjusting a power capacity of the UPS system using the controller based on the power availability.

2. The method of claim 1, further comprising:
obtaining a user defined power schedule for the UPS system;
wherein determining the power availability for the UPS system is based on the user defined power schedule and the log based power schedule.

3. The method of claim 2, further comprising:
obtaining a user defined power overhead for the UPS system;
wherein determining the power availability for the UPS system is further based on the user defined power overhead.

4. The method of claim 3, wherein determining the power availability for the UPS system includes:
comparing the log based power schedule with the user defined power schedule; and
setting the power availability based on the user defined power overhead and one of the log based power schedule and the user defined power schedule in response to the comparing.

5. The method of claim 1, wherein adjusting the power capacity includes one of hibernating and activating at least one unit of the plurality of units of the UPS system.

6. The method of claim 5, wherein the UPS system includes a modular UPS system and the at least one unit includes a power module of the modular UPS system.

7. The method of claim 5, wherein the UPS system includes a parallel UPS system and the at least one unit includes a UPS of the parallel UPS system.

8. The method of claim 1, wherein determining the log based power schedule includes:
comparing the actual power consumption with a previous log based power schedule; and
determining the log based power schedule based on a result of the comparing.

9. The method of claim 8, wherein determining the log based power schedule further includes:
setting the log based power schedule to the actual power consumption in response to determining that the actual power consumption is greater than or equal to the previous log based power schedule; and
setting the log based power schedule to be less than the previous log based power schedule in response to determining that the actual power consumption is less than the previous log based power schedule.

10. A UPS (Uninterruptible Power Supply) system comprising:
an input configured to receive input power from an input power source;
an output configured to provide output power to a load;
a plurality of units coupled to the input and the output;
a controller coupled to the plurality of units, the controller being configured to:
obtain an actual power consumption over a continuous period by the load, determine a log based power schedule based on the actual power consumption over the continuous period,
determine a power availability for the UPS system based on the log based power schedule, and
adjust a power capacity of the UPS system based on the power availability.

11. The UPS system of claim 10, wherein each unit of the plurality of units is independently controllable by the controller, the controller being further configured to adjust the power capacity based on one of hibernating and activating at least one unit of the plurality of units.

12. The UPS system of claim 10, wherein the plurality of units includes at least one of a power module and a UPS.

13. The UPS system of claim 10, wherein the controller is further configured to:
compare the actual power consumption with a previous log based power schedule, and
determine the log based power schedule based on a result of comparing the actual power consumption with the previous log based power schedule.

14. The UPS system of claim 13, wherein the controller is further configured to:
set the log based power schedule to the actual power consumption in response to a determination that the actual power consumption is greater than or equal to the previous log based power schedule, and
set the log based power schedule to be less than the previous log based power schedule in response to a determination that the actual power consumption is less than the previous log based power schedule.

15. The UPS system of claim 14, wherein the controller is further configured to:
obtain a user defined power schedule for the UPS system, and
determine the power availability for the UPS system based on the user defined power schedule and the log based power schedule.

16. The UPS system of claim 15, wherein the controller is further configured to:
compare the log based power schedule with the user defined power schedule, and
set the power availability based on one of the log based power schedule and the user defined power schedule in response to comparing the log based power schedule with the user defined power schedule.

17. A UPS (Uninterruptible Power Supply) system comprising:
an input configured to receive input power from an input power source;
an output configured to provide output power to a load;
a plurality of units coupled to the input and the output; and
means for controlling each unit of the plurality of units to adjust a power capacity of the UPS system based on a power availability, wherein the means for controlling is coupled to the plurality of units; and wherein the means for controlling is further configured to obtain an actual power consumption over a continuous period by the load, determine a log based power schedule based on the actual power consumption over the continuous period, and determine the power availability based on the log based power schedule.

18. The UPS system of claim 17, wherein the means for controlling is further configured to:
- compare the actual power consumption with a previous log based power schedule,
- set the log based power schedule to the actual power consumption in response to a determination that the actual power consumption is greater than or equal to the previous log based power schedule, and
- set the log based power schedule to be less than the previous log based power schedule in response to a determination that the actual power consumption is less than the previous log based power schedule.

19. The UPS system of claims 17, further comprising:
means for obtaining a user defined power schedule for the UPS system;
wherein the means for controlling is further configured to compare the log based power schedule with the user defined power schedule, and set the power availability based on one of the log based power schedule and the user defined power schedule in response to comparing the log based power schedule with the user defined power schedule.

\* \* \* \* \*